US009178873B2

United States Patent
Dong et al.

(10) Patent No.: US 9,178,873 B2
(45) Date of Patent: Nov. 3, 2015

(54) SYSTEMS AND METHODS FOR SECURE PASSWORD ENTRY

(71) Applicant: EBAY INC., San Jose, CA (US)

(72) Inventors: Grom Dong, Shanghai (CN); Koson Cao, Shanghai (CN)

(73) Assignee: PAYPAL. INC., San Jose, CA (US)

( * ) Notice: Subject to any disclaimer, the term of this patent is extended or adjusted under 35 U.S.C. 154(b) by 0 days.

(21) Appl. No.: 14/133,425

(22) Filed: Dec. 18, 2013

(65) Prior Publication Data

US 2015/0172273 A1    Jun. 18, 2015

(51) Int. Cl.
*H04L 9/00* (2006.01)
*H04L 29/06* (2006.01)

(52) U.S. Cl.
CPC .................................. *H04L 63/083* (2013.01)

(58) Field of Classification Search
USPC ........................................................ 726/3–10
See application file for complete search history.

(56) References Cited

U.S. PATENT DOCUMENTS 6,980,081 B2 * 12/2005 Anderson .................... 340/5.53
2007/0300292 A1 * 12/2007 Scipioni et al. .................. 726/5

* cited by examiner

*Primary Examiner* — Ghazal Shehni
(74) *Attorney, Agent, or Firm* — Haynes and Boone, LLP

(57) ABSTRACT

Systems and methods for secure password entry are provided. When a user wishes to log in or otherwise authenticate as an authorized user of a system using a password, the system can provide an apparently random sequence of characters to the user. The user can select all of the characters in the sequence of characters that also appear in the user's password. The system can determine whether all of the selected characters are in the password and that all of the characters in the sequence of characters that are also in the password were selected. The user can select the characters in any order and the selected characters can include less than all of the characters in the password. In this way, the system can authenticate the user without the user entering their entire password, thereby increasing both the efficiency and the security of the password entry operation.

20 Claims, 4 Drawing Sheets

SYSTEMS AND METHODS FOR SECURE PASSWORD ENTRY

BACKGROUND

1. Field of the Invention

This application relates generally to electronic authorization and more particularly to systems and methods for secure password entry.

2. Related Art

The use of a user login name and a password for authorization of a user of a computing system is well known. In a conventional system, the user is provided with empty fields into which the user enters their user login name and password. The user login name and password are typically entered into the appropriate fields using a real or virtual QWERTY keyboard and/or a numerical keypad.

If the entered user login name and password do not exactly match the stored login name and password for the user, authentication (log-in) is denied. Only when the user exactly enters the correct login name and password exactly is authentication of the user successful.

In this kind of system, the user enters each and every character in their password in order every time they wish to log into the system. If care is not taken, this type of configuration can lead to security risks. For example, because the user always enters the exact same sequence of characters, the risk of the entire password being observed while being entered and/or the risk of physical residue or wear on the keyboard that gives clues to a repeatedly entered password can be exploited.

It would therefore be desirable to provide systems and methods for password entry or other secret number or word entry with increased security.

Figure 1:
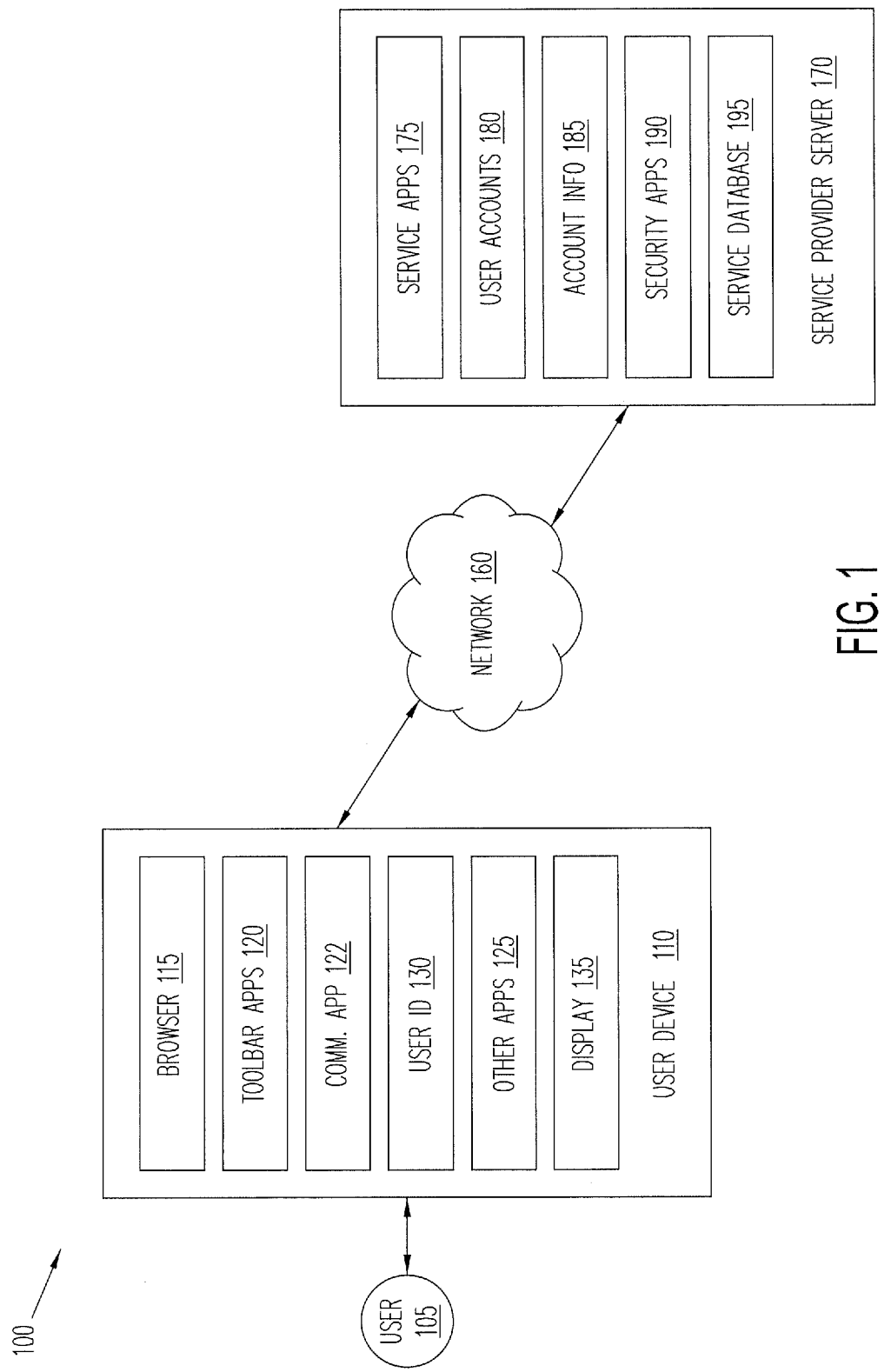
FIG. 1 is block diagram of a networked system suitable for implementing a process for secure password entry according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Exemplary applications of apparatuses and methods according to the present invention are described in this section. These examples are being provided solely to add context and aid in the understanding of the invention. It will thus be apparent to one skilled in the art that the present invention may be practiced without some or all of these specific details. In other instances, well known process steps have not been described in detail in order to avoid unnecessarily obscuring the present invention. Other applications are possible, such that the following examples should not be taken as limiting.

In the following detailed description, references are made to the accompanying drawings, which form a part of the description and in which are shown, by way of illustration, specific embodiments of the present invention. Although these embodiments are described in sufficient detail to enable one skilled in the art to practice the invention, it is understood that these examples are not limiting, such that other embodiments may be used, and changes may be made without departing from the spirit and scope of the invention.

Reference throughout the specification to "various embodiments," "some embodiments," "one embodiment," "an embodiment," "various examples," "one example," "an example," or "some examples" means that a particular feature, structure, or characteristic described in connection with the embodiment or example is included in at least one embodiment. Thus, appearances of these are not necessarily all referring to the same embodiment. Furthermore, the particular features, structures or characteristics may be combined in any suitable manner in one or more embodiments.

According to an embodiment, a computer program product can comprise a non-transitory machine readable medium. The non-transitory machine readable medium can have computer readable and executable code for instructing one or more processors to perform any of the methods disclosed herein.

FIG. 1 is a block diagram of a networked system 100 configured to facilitate a process for secure entry of a secret word, number, or other set of characters such as a process for secure password entry in accordance with an embodiment of the disclosure. Networked system 100 may comprise or implement a plurality of servers and/or software components that operate to perform various payment transactions or processes. Exemplary servers may include, for example, stand-alone and enterprise-class servers operating a server OS such as a MICROSOFT® OS, a UNIX® OS, a LINUX® OS, or other suitable server-based OS. It can be appreciated that the servers illustrated in FIG. 1 may be deployed in other ways and that the operations performed and/or the services provided by such servers may be combined or separated for a given implementation and may be performed by a greater number or fewer number of servers. One or more servers may be operated and/or maintained by the same or different entities.

System 100 may include a user device 110 and a service provider server 170 in communication over a network 160. Service provider server 170 may be maintained by an online service provider, such as an email service provider, a banking service provider, a records service provider, a payment service such as PayPal, Inc. of San Jose, Calif., or any other service provider that maintains user accounts into which a user can log in using a password or execute transactions using a password or other secret number, code, or word. A user 105, such as a sender or consumer, utilizes user device 110 to interact (e.g., to perform transactions such as payments or other operations) with service provider server 170. For example, a user 105 may utilize user device 110 to initiate a payment transaction, receive a transaction approval request, or reply to the request. Note that transaction, as used herein, refers to any suitable action performed using the user device, including payments, transfer of information, display of information, accessing of user account information, sending messages, receiving messages, posting items for sale, purchasing items, bidding on items for sale, etc.

User device 110 and service provider server 170 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 160.

Network 160 may be implemented as a single network or a combination of multiple networks. For example, in various embodiments, network 160 may include the Internet or one or more intranets, landline networks, wireless networks, and/or other suitable networks.

User device 110 may be implemented using any appropriate hardware and software configured for wired and/or wireless communication over network 160. For example, in one embodiment, the user device may be implemented as a personal computer (PC), a smart phone, personal digital assistant (PDA), laptop computer, and/or other types of computing devices capable of transmitting and/or receiving data.

User device 110 may include one or more browser applications 115 which may be used, for example, to provide a convenient interface to permit user 105 to browse information available over network 160. For example, in one embodiment, browser application 115 may be implemented as a web browser configured to view information available over the Internet, such as a user account. User device 110 may also include one or more toolbar applications 120 which may be used, for example, to provide client-side processing for performing desired tasks in response to operations selected by user 105. In one embodiment, toolbar application 120 may display a user interface in connection with browser application 115.

User device 110 may further include other applications 125 as may be desired in particular embodiments to provide desired features to user device 110. For example, other applications 125 may include security applications for implementing client-side security features, programmatic client applications for interfacing with appropriate application programming interfaces (APIs) over network 160, or other types of applications.

Applications 125 may also include email, texting, voice and instant messing applications that allow user 105 to send and receive entails, calls, and/or text messages through network 160, as well as applications that enable the user to communicate, transfer information, make payments, and otherwise utilize a smart wallet through a payment provider as discussed above. User device 110 may include one or more user identifiers 130 which may be implemented, for example, as operating system registry entries, cookies associated with browser application 115, identifiers associated with hardware of user device 110, or other appropriate identifiers, such as used for payment/user/device authentication. In one embodiment, user identifier 130 may be used by a service provider to associate user 105 with a particular account maintained by the service provider. A communications application 122, with associated interfaces, enables user device 110 to communicate within system 100.

User device 110 may include applications for collecting environmental data, such as geo-location data via Global Positioning System (GPS), temperature data, altitude data, humidity data, data regarding device movement, ambient sound data, imaging data via a camera, etc.

User device 110 may include one or more displays such as display 135. Display 135 may be a display based on any suitable display technology and may be operable to display images to the user. Display 135 may be a touchscreen display that is able to receive touch input from user 105. In various embodiments, display 135 may be used to display apparently random sequences of characters (e.g., random, semi-random, and/or non-random sequences of characters that, when displayed to a user, appear to be random) that are selectable by user 105 during a password entry operation. The displayed characters can be selected by the user by touching display 135 at the location of the displayed characters and/or by moving a cursor over the location of the displayed characters using a mouse, a touchpad or other input device.

Service provider server 170 may be maintained, for example, by an online service provider which may provide one or more online services to user 105. In this regard, service provider server 170 includes one or more service applications 175 which may be configured to interact with user device 110 over network 160 to facilitate the services and communicate/display information at user device 110. For example, service provider server 170 may provide services, such as payment transaction services, banking services, retail shopping services, etc.

Service provider server 170 may also maintain a plurality of user accounts 180. Each user account 180 may include account information 185 associated with one or more users. For example, account information 185 may include private information of users such as financial information, account numbers, passwords, device identifiers, user names, phone numbers, credit card information, bank information, or other information which may be used to facilitate online transactions by user 105. Account information 185 may also include security profiles for users or user devices.

Security applications 190, which may be part of service application 175 or may be separate from service application 175, may be configured to receive security information from a user device for processing and storage in a service database 195. Security applications 190 may include one or more applications for processing and managing security information from user 105. Security applications 190 may include an application for generating apparently random sequences of characters. An apparently random sequence of characters may be a sequence of characters (e.g., letters, numbers, special characters, or other characters that may be used to form a password) that are randomly selected from a larger character set, purposefully selected from a larger character set in a way that appears random, arranged in a random order, purposefully arranged in an order that appears random or any combination of these.

An apparently random sequence of characters may be displayed to a user that is attempting to authenticate as an authorized user using display 135. An apparently random sequence of characters that is displayed to a user may include one or more characters that are also in a password of the user that is stored in account information 185. An apparently random sequence of characters may be a sequence of any suitable length and may include one more of the same characters. In various embodiments, an apparently random sequence of characters may include more characters than the number of characters in the user's password, fewer characters than the number of characters in the user's password or the same number of characters that are in the user's password. A password may be any group of characters (e.g., letters, numbers, special characters, capital letters, lower case letters, etc.) provided to or chosen by a user. In some situations a password may be referred to by other names such as a personal identification number (PIN).

In embodiments in which the number of characters in the apparently random sequence of characters is less than the number of characters in the user's password, the process of authenticating (e.g., the process of entering the password) may take less time for the user and for the system. In this way, the efficiency of the password entry operation may be increased. Moreover, using its prior knowledge of the user's password, the system may be able to recognize an entered password based on a set of selected characters in the apparently random sequence of characters that contains less than all of the characters in the user's password. A password entry operation of this type may be more secure than a password entry operation in which all of the characters of the user's password are entered, particularly operations in which all of the characters of the user's password are entered in order.

Security applications 190 may generate apparently random (e.g., random, semi-random, or non-random but selected and/or arranged to appear random) sequences of characters. A random sequence of characters may, for example, be a sequence of characters selected from a larger character set based on a random selection algorithm. A semi-random sequence of characters may, for example, be a sequence of characters (e.g., letters, numbers, special characters, etc.) selected from a larger character set based on a random selection algorithm that is weighted or required to include one or more characters that are in a password of a user that is attempting to authenticate. A non-random sequence of characters that is selected and/or arranged to appear random may be, for example, a sequence of characters selected from a larger character set using an algorithm that purposefully selects some characters that are in the user's password and some characters that are not in the user's password and, if desired, arranges the characters in a random or semi-random order. A semi-random or non-random sequence of characters may, in some embodiments, be chosen as the apparently random sequence of characters in order to ensure that at least one character in the user's password appears in the apparently random sequence. Service application 175 may be further configured to determine the existence of and to manage accounts for user 105, as well as create new accounts if necessary, such as the set up and management of user accounts.

Figure 2:
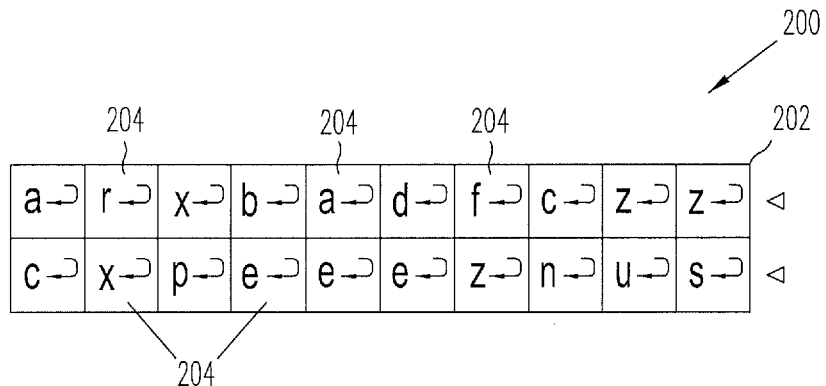
FIG. 2 is a diagram of a portion of a display of a user device showing how an apparently random sequence of characters may be displayed during secure password entry operations according to an embodiment.

FIG. 2 shows an illustrative portion 200 of a display such as display 135 of user device 110. As shown in FIG. 2, a portion 200 of a user device display may be used to display a character sequence 202 to a user. Character sequence 202 may be an apparently random character sequence as described herein.

In the example of FIG. 2, a sequence of 20 characters that is arranged in two rows of 10 characters each is shown. However, this is merely illustrative. Sequence 202 may have more than 20 characters or less than 20 characters and may be arranged in any suitable pattern.

In one embodiment, the number of characters 204 in sequence 202 is determined based on the length of the password of the user to whom the sequence is being displayed as determined by accessing the user's account. In other embodiments, the number of characters 204 in various sequences 202 can be the same or different for a user and/or for multiple users.

The size and location of portion 200 of the display on which sequence 202 is displayed and/or the number of characters in sequence 202 may be optimized during design and manufacturing operations for a security application based on an optimized sequence size that minimizes user entry error. For example, based on a minimum error rate determined in tests in which test users enter various passwords many times using various display portion sizes and sequence sizes, an optimal display portion size and sequence size may be obtained. In this way, it may be determined that, for a particular type of mobile device or screen size, an optimal size for portion 200 of a display is a fraction (e.g., a quarter, half, an eighth, etc.) of the total display size. For example, a smaller display may have a higher fraction as the optimal size, whereas a larger display may have a smaller fraction. During operation, a security application may determine (e.g., using a JavaScript or native operating system call to the user device) the size of the display and provide instructions to the user device for displaying the apparently random sequence of characters on the display using a suitable sized sequence 202 based on a predetermined minimum error rate.

In one suitable embodiment that is sometimes discussed herein as an example, instructions may be provided to use a portion 200 with a width that is equal to the available display screen width minus a ten pixel margin on both sides of the portion 200 and a height that is equal to one quarter of the display screen height. This type of configuration may be suitable for display on, for example, handheld and/or mobile device displays. For larger displays such as desktop displays, other optimal portion sizes may be used.

Sequence 202 may be displayed to a user when the user provides user-identifying information such as a login name, a customer number, or an email address. In some embodiments, the user-identifying information may be provided automatically by a user device (e.g., using a cookie or other information such as information 130 of FIG. 1). A system that is displaying sequence 202 may also obtain the user's stored password. Some of characters 204 in any particular sequence 202 may also be characters in the user's password. Characters 204 in sequence 202 that are also characters in the user's password may be randomly included in sequence 202 or may be purposely included in sequence 202.

Figure 3:
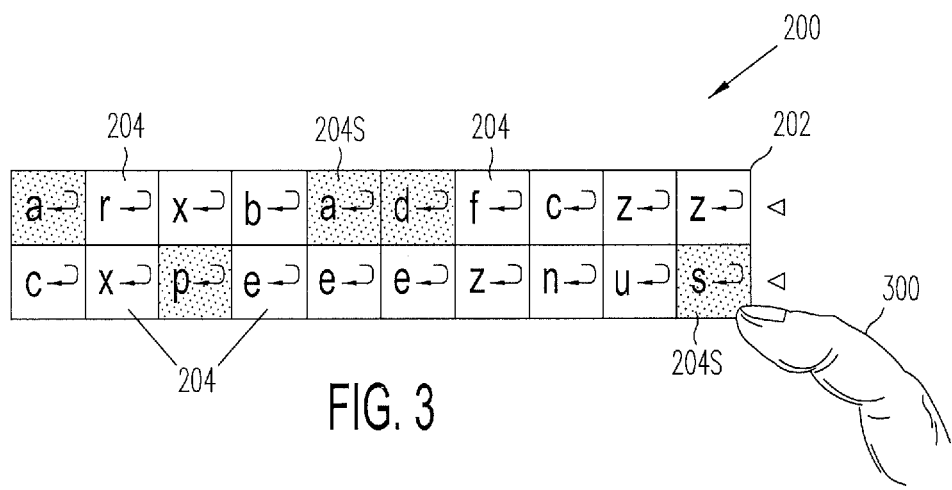
FIG. 3 is a diagram of a portion of a display of a user device showing how a user may select characters in the apparently random sequence of characters that are also in the user's password during secure password entry operations according to an embodiment.

When a user having a password such as 'password' wishes to log in or otherwise authenticate as an authorized user, the user may, upon being presented with a sequence 202, select characters in the sequence that are also in the user's password as shown in FIG. 3.

As shown in FIG. 3, a user may utilize an entry device such as entry device 300 (e.g., the user's finger on a touchscreen display, another entry device on a touchscreen display, or a mouse, touchpad or other device for selecting displayed characters) to select characters 204S that appear in the user's password 'password' (as an example). In the example of FIG. 3, the user has selected all instances of the letters 'p', 'a', 's', and 'd' because those characters appear in the user's password. In this example, the user has selected the letter 'a' twice, even though the letter 'a' only appears once in the user's password and the user has selected the letter 's' only once even though the letter 's' appears twice in the user's password. In this example, other characters in the user's password (e.g., 'w') are not included in sequence 202.

Presenting an apparently random sequence of characters to a user for password entry in this way therefore provides multiple security and efficiency enhancements. The user's selection of characters 204S provides no information about the number of times each character appears in the user's password even if the entire password entry operation were to be observed by a potential password thief. Moreover, less than all of the characters in a user's password are selected in any given password entry operation. It would therefore be impossible for a potential thief to obtain the user's password even if every aspect of the user's password entry operation were to be observed. The password entry operation can also be faster than a conventional password entry operation in which all of the characters of the password are entered.

The system may authenticate the user if all of the selected characters 204S also appear in the user's password and/or if all of the characters in the user's password that are included in sequence 202 have been selected. In this way, a system may be provided in which a user may enter a single password many times without touching the same portion of an entry device in the same way, and without entering the same set of characters more than once. This type of system can increase the difficulty of observing and/or stealing the user's password.

Figure 4:
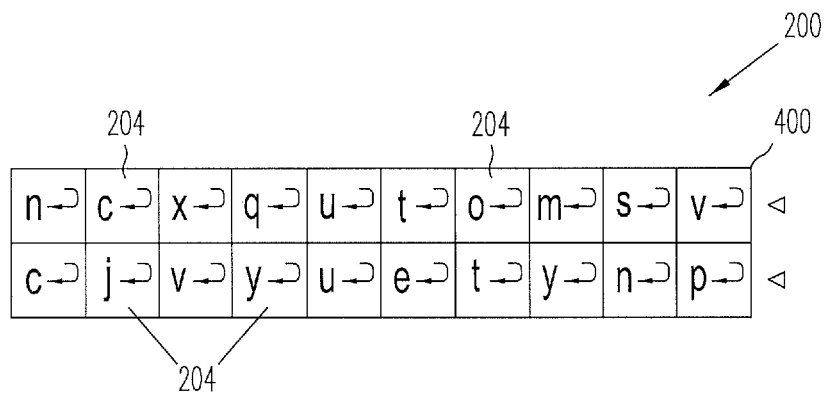
FIG. 4 is a diagram of a portion of a display of a user device showing how a different apparently random sequence of characters may be displayed when the selected characters do not authenticate the user during secure password entry operations according to an embodiment.

In a situation in which the user fails to select all of the characters in sequence 202 that appear in the user's password and/or the user selects characters that are not in the user's password, authentication may fail and the user may be presented with a new sequence of characters such as sequence 400 of FIG. 4. As shown in FIG. 4, each time a sequence of characters is displayed, the individual characters 204 in the sequence may be different.

Because sequence 400 includes a different set of apparently randomly selected and distributed characters from any previously provided apparently random sequence of characters (e.g., sequence 202), when the user selects characters from sequence 400, the characters in sequence 400 that are also in the user's password will be different (and differently arranged) than the matching characters in any previous sequence. This provides multiple security and efficiency benefits. For example, when the user again attempts to select the matching characters in the apparently random sequence that are also in the user's password, a different set of characters will be selected. An observer of the password entry process would therefore observe two different sets of selected characters and would therefore be unable to identify the user's password without the system's prior knowledge of the password. Moreover, the effectiveness of brute force attacks in which an attacking computing system tries to guess a user's password many times can be reduced because the correct entry for the same password may not be the same from entry to entry.

Figure 5:
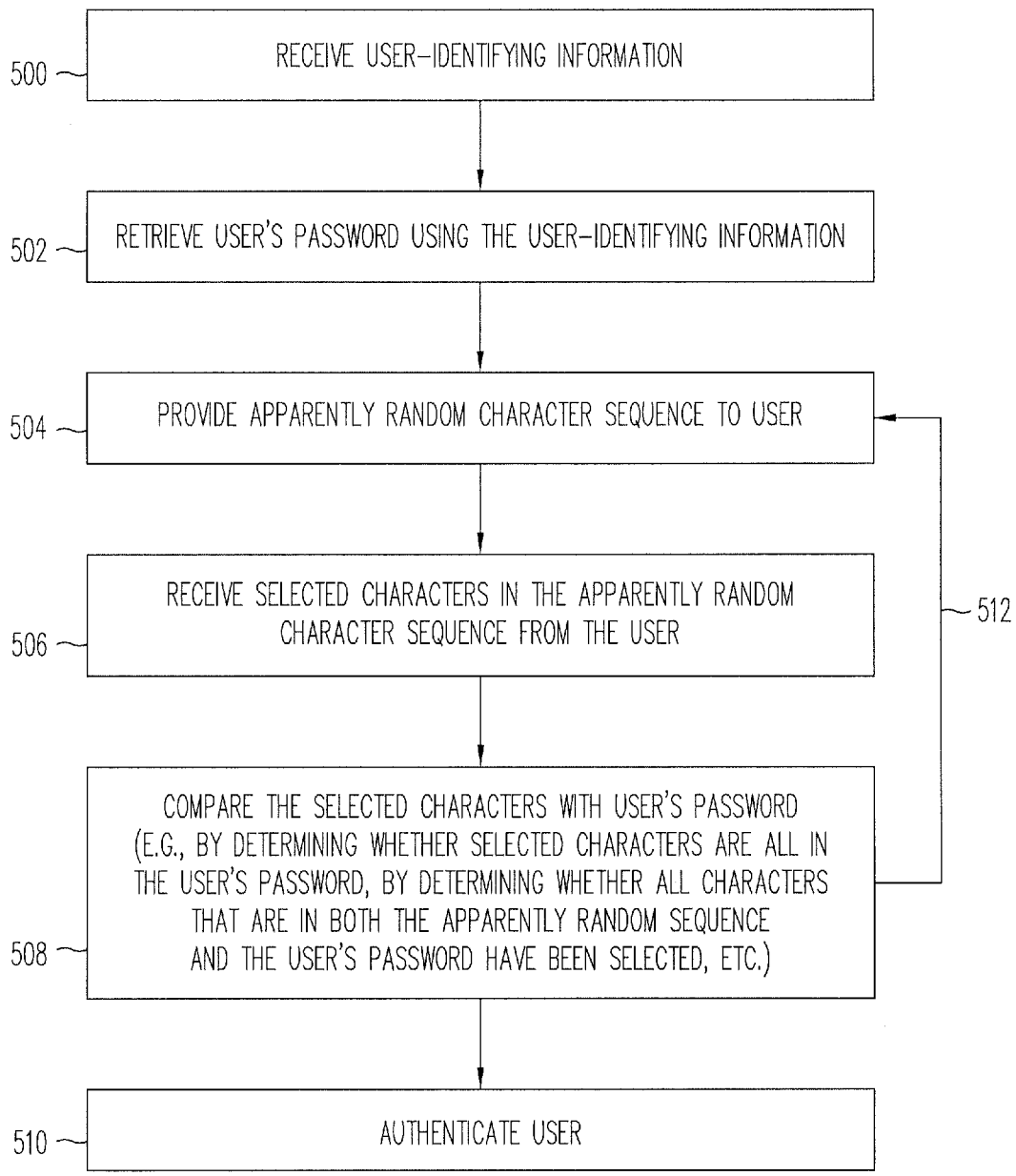
FIG. 5 is a flowchart showing an illustrative process for secure authorization of a user according to an embodiment.

Illustrative steps that may be involved in providing secure password entry for a user according to one embodiment are shown in FIG. 5. The process of FIG. 5 may be performed by service provider server such as service provider server 170 in a network based system such as system 100 of FIG. 1.

At step 500, the server (e.g., a processor of the server) may receive user-identifying information. The user-identifying information may be received from a user device such as user device 110 of FIG. 1. The user-identifying information may be a username, an email address, a customer number, a license number, a passport number or any other information that identifies the user to the server. The user-identifying information may have been chosen by the user during an account setup process for the user on the server according to an embodiment. The server may store (e.g., in memory) a copy of the user-identifying information along with other information for that user in, for example, a user account.

At step 502, the server may retrieve the user's password using the user-identifying information. Retrieving the user's password using the user-identifying information may include accessing an account of the user that is associated with the user-identifying information and retrieving (e.g., reading from memory), the user's stored password from the user account.

At step 504, the server may provide an apparently random character sequence to the user (e.g., by transmitting the apparently random character sequence to a user device of the user with instructions to display the apparently random character sequence to the user on a display of the user device). The apparently random character sequence may be a sequence of characters of the type described above in connections with, for example, FIGS. 2, 3, and 4. As described herein, an apparently random sequence of characters may have more characters than the number of characters in the user's password, the same number of characters as the number of characters in the user's password, or a number of characters that is smaller than the number of characters in the user's password. The number of characters in the apparently random sequence of characters may be chosen based on an optimized balance of security and efficiency for the password entry processes.

For example, in an apparently random sequence having only a single character, the character is either in the password or not in the password and the chance of guessing the correct entry (e.g., selecting or not selecting the character) is 50%. Each additional character in the apparently random sequence of characters reduces the likelihood that a guess will be a correct entry. Each additional character also adds to the time it takes for a user to select the matching characters. The apparently random sequence of characters may therefore have one, two, three, four, five, six, more than six, ten, more than ten or any other suitable number of characters that balances the efficiency of entry with the difficulty of guessing the correct entry.

An apparently random sequence of characters may have zero, one, two, or more than two characters that also appear in the user's password. In some embodiments, the apparently random sequence of characters may be generated in a way that ensures that at least one character in the sequence also appears in the user's password.

At step 506, the server may receive selected characters in the apparently random sequence of characters from the user. The server may receive the selected characters from the user when the user taps, touches, clicks, or otherwise selects any characters in the apparently random character sequence (e.g., characters that also appear in the user's password). The user's selections may be transmitted to the server by communications circuitry in the user device. In some situations, an apparently random sequence of characters may not include any characters that appear in the user's password. In this type of situation, the received selected characters may be an empty character set containing no characters.

At step 508, the server may compare the selected characters with the user's password. The server may compare the selected characters with the user's password by determining whether the selected characters are all in the user's password, determining whether all of the characters that are in both the apparently random character sequence and the user's password have been selected, and/or performing other comparisons such as correlation analyses, cross-correlation analyses or other statistical or other comparisons of the selected characters and the characters of the user's password.

At step 510, if all of the selected characters are in the user's password and/or all of the characters that are in both the apparently random character sequence and the user's password have been selected, the user may be authenticated.

If any of the selected characters are not in the user's password and/or if any of the characters that are in both the apparently random character sequence and the user's password have not been selected, the user may not be authenticated and the server may return to step 504 (as indicated by arrow 512). Upon returning to step 504, a different apparently random sequence of characters may be provided to the user and steps 506 and 508 may be repeated.

In situations in which an apparently random sequence has no characters that are in the user's password and the user selects no characters in that sequence, the user may either be authorized based on a correct selection of no characters or may be presented with a new apparently random sequence of characters.

A system may return to step 504 as indicated by arrow 512 any suitable number of times. In some embodiments, the number of times in which a system may provide new apparently random sequences of characters for password entry may be limited in order to prevent a computer from attempting to guess a user's password an undesirable number of times. In general, the steps described above in connection with FIG. 6 may be performed in any suitable order, combined, and/or repeated in any suitable way for secure password entry.

Figure 6:
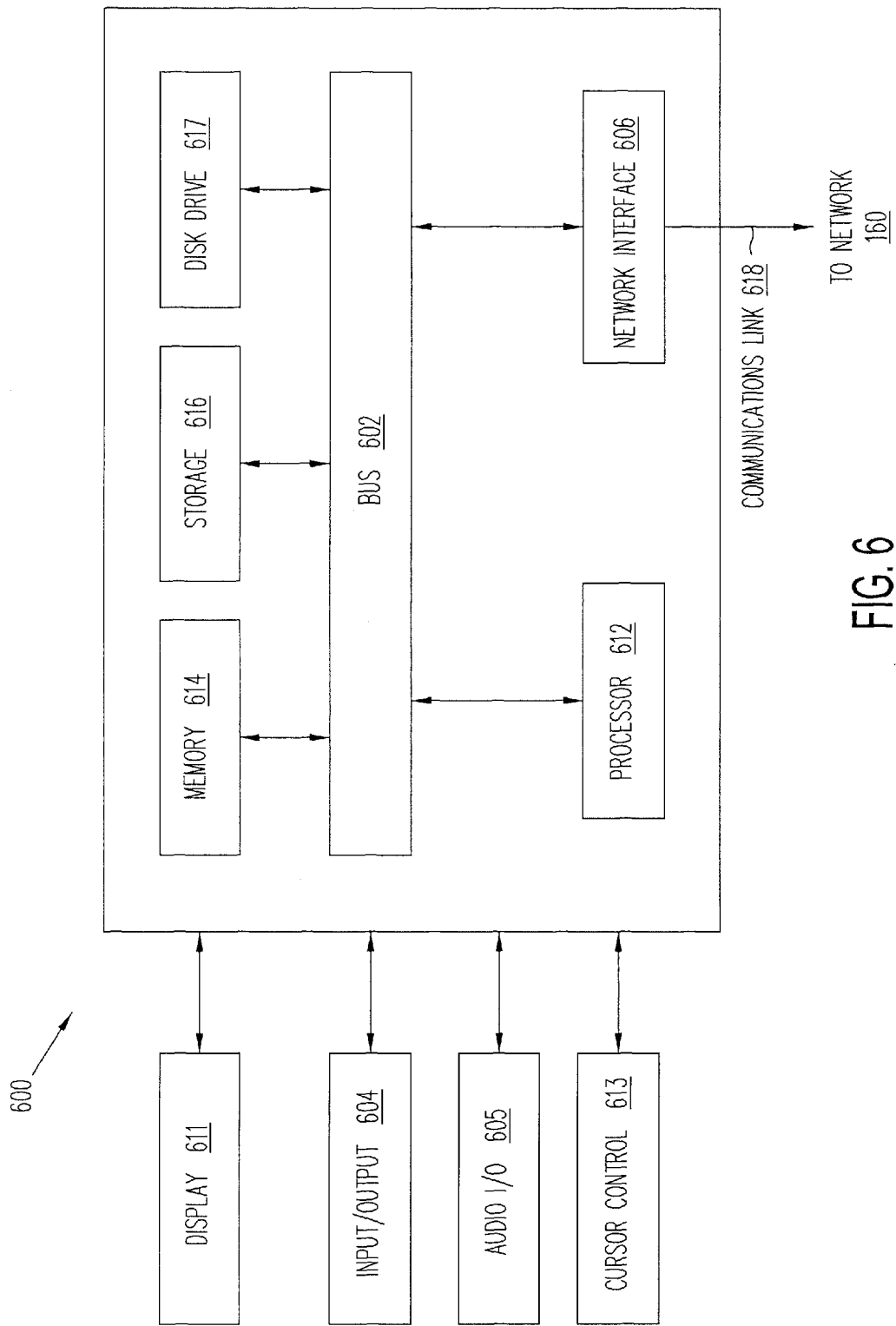
FIG. 6 is a block diagram of a computer system suitable for implementing one or more components in FIG. 1 according to an embodiment.

FIG. 6 is a block diagram of a computer system 600 suitable for implementing one or more embodiments of the present disclosure. In various implementations, the user device may comprise a personal computing device (e.g., smart phone, a computing tablet, a personal computer, laptop, PDA, Bluetooth device, key FOB, badge, etc.) capable of communicating with the network. The service provider may utilize a network computing device (e.g., a network server) capable of communicating with the network. It should be appreciated that each of the devices utilized by users, merchants, and payment providers may be implemented as computer system 600 in a manner as follows.

Computer system 600 includes a bus 602 or other communication mechanism for communicating information data, signals, and information between various components of computer system 600. Components include an input/output (I/O) component 604 that processes a user action, such as selecting keys from a keypad/keyboard, selecting one or more buttons or links, etc., and sends a corresponding signal to bus 602. I/O component 604 may also include an output component, such as a display 611 and a cursor control 613 (such as a keyboard, keypad, mouse, etc.). An optional audio input/output component 605 may also be included to allow a user to use voice for inputting information by converting audio signals. Audio I/O component 605 may allow the user to hear audio. A transceiver or network interface 606 transmits and receives signals between computer system 600 and other devices, such as a user device, a merchant server, or a payment provider server via network 160. In one embodiment, the transmission is wireless, although other transmission mediums and methods may also be suitable. A processor 612, which can be a micro-controller, digital signal processor (DSP), or other processing component, processes these various signals, such as for display on computer system 600 or transmission to other devices via a communication link 618. Processor 612 may also control transmission of information, such as cookies or IP addresses, to other devices.

Components of computer system 600 also include a system memory component 614 (e.g., RAM), a static storage component 616 (e.g., ROM), and/or a disk drive 617. Computer system 600 performs specific operations by processor 612 and other components by executing one or more sequences of instructions contained in system memory component 614.

Logic may be encoded in a computer readable medium, which may refer to any medium that participates in providing instructions to processor 612 for execution. Such a medium may take many forms, including but not limited to, non-volatile media, volatile media, and transmission media. In various implementations, non-volatile media includes optical or magnetic disks, volatile media includes dynamic memory, such as system memory component 614, and transmission media includes coaxial cables, copper wire, and fiber optics, including wires that comprise bus 602. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 600. In various other embodiments of the present disclosure, a plurality of computer systems 600 coupled by communication link 618 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system, comprising:
a memory having stored user account information that includes a password for a user, wherein the password includes a number of total characters and a number of different characters; and
one or more processors in communication with the memory and configured to:
receive user-identifying information from the user,
retrieve the password from the user account information using the user-identifying information,
provide an apparently random sequence of characters to the user,
receive selected characters in the apparently random sequence of characters from the user, wherein the selected characters comprise fewer characters than the number of total characters in the password or fewer different characters than the number of different characters in the password, and
compare the selected characters with the password to determine whether to authenticate the user.

2. The system defined in claim 1, wherein the selected characters include at least two of a character that appears in the password only once.

3. The system defined in claim 1, wherein the one or more processors are configured to compare the selected characters with the password by determining whether the selected characters all appear in the password.

4. The system defined in claim 3, wherein the apparently random sequence of characters includes a plurality of characters that appear in the password and wherein the one or more processors are further configured to compare the selected characters with the password by determining whether all of the plurality of characters were received as selected characters.

5. The system defined in claim 4, wherein the one or more processors are further configured to:
authenticate the user in response to determining that the selected characters all appear in the password and that all of the plurality of characters were received as selected characters.

6. The system defined in claim 4, wherein the one or more processors are further configured to:
provide an additional apparently random sequence of characters to the user in response to determining that any of the selected characters do not appear in the password.

7. The system defined in claim 1, wherein the apparently random sequence of characters includes a different number of total characters, and wherein the number of total characters in the password is greater than the different number of total characters in the apparently random sequence of characters.

8. The system defined claim 1, further comprising:
a user device having a display, wherein the one or more processors are configured to provide instructions to the user device for displaying the apparently random sequence of characters on the display and wherein the instructions are based on a predetermined minimum error rate.

9. A method comprising:
receiving, electronically by a processor, user-identifying information from a user;
retrieving, electronically by the processor, a password for the user from a user account using the user-identifying information, wherein the password includes a number of total characters and a number of different characters;
providing, electronically by the processor, an apparently random sequence of characters to the user;
receiving, electronically by the processor, selected characters in the apparently random sequence of characters from the user, wherein the selected characters comprise fewer characters than the number of total characters in the password or fewer different characters than the number of different characters in the password; and
comparing, electronically by the processor, the selected characters with the password to determine whether to authenticate the user.

10. The method defined in claim 9, wherein the selected characters include at least two of a character that appears in the password only once.

11. The method defined in claim 9, wherein the comparing comprises determining whether the selected characters all appear in the password.

12. The method defined in claim 11, wherein the apparently random sequence of characters includes a plurality of characters that appear in the password and wherein the comparing further comprises determining whether all of the plurality of characters were received as selected characters.

13. The method defined in claim 12, further comprising:
in response to determining that the selected characters all appear in the password and that all of the plurality of characters were received as selected characters, authenticating the user.

14. The method defined in claim 12, further comprising:
in response to determining that any of the selected characters do not appear in the password, providing an additional apparently random sequence of characters to the user.

15. The method defined in claim 9, wherein the apparently random sequence of characters includes a different number of total characters, and wherein the number of total characters in the password is greater than the different number of total characters in the apparently random sequence of characters.

16. A non-transitory machine-readable medium having a plurality of machine-readable instructions which, when executed by one or more processors of a server, are adapted to cause the server to perform a method comprising:
receiving user-identifying information from a user;
retrieving a password for the user from a user account using the user-identifying information, wherein the password includes a number of total characters and a number of different characters;
providing an apparently random sequence of characters to the user;
receiving selected characters in the apparently random sequence of characters from the user, wherein the selected characters comprise fewer characters than the number of total characters in the password or fewer different characters than the number of different characters in the password; and
comparing the selected characters with the password to determine whether to authenticate the user.

17. The non-transitory machine-readable medium defined in claim 16, wherein the method further comprises:
authenticating the user based on the comparing.

18. The non-transitory machine-readable medium defined in claim 16, wherein the selected characters include at least two of a character that appears in the password only once.

19. The non-transitory machine-readable medium defined in claim 16, wherein the comparing comprises determining whether the selected characters all appear in the password.

20. The non-transitory machine-readable medium defined in claim 16, wherein the method further comprises:
providing an additional apparently random sequence of characters to the user in response to determining that any of the selected characters do not appear in the password.

* * * * *